Oct. 31, 1961     J. R. NEWMAN, JR     3,006,060
GEAR FINISHING
Filed Dec. 9, 1957
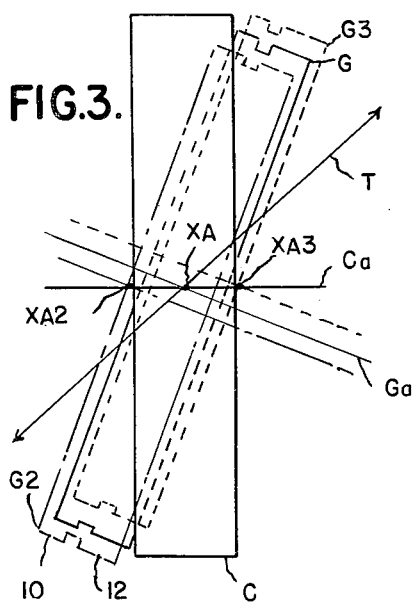
FIG.3.
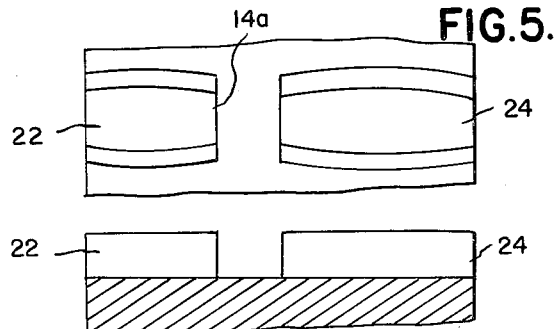
FIG.5.
FIG.4.
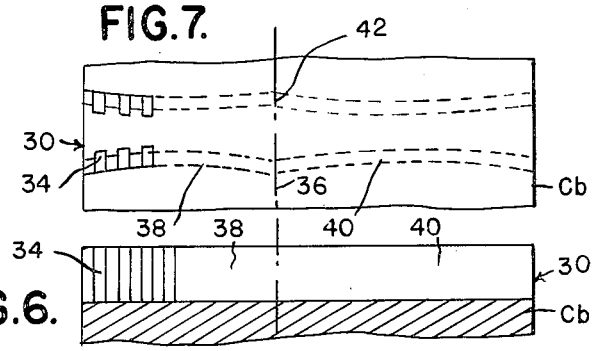
FIG.7.
FIG.6.
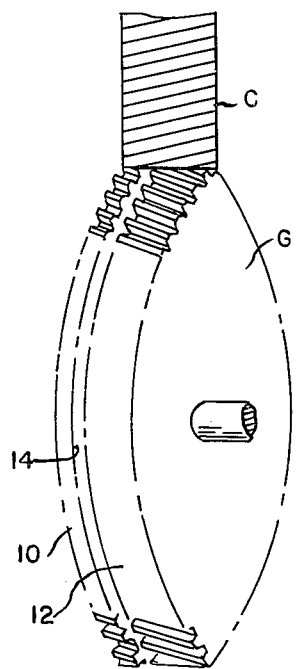
FIG.1.
(PRIOR ART)
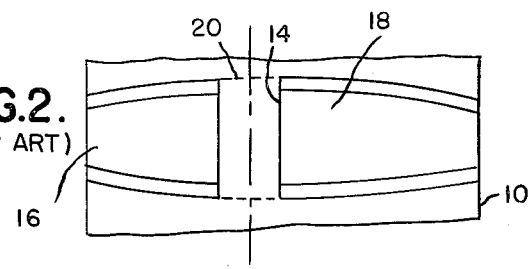
FIG.2.
(PRIOR ART)
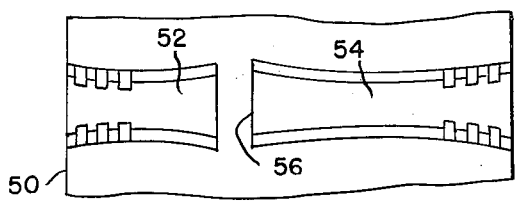
FIG.8.
INVENTOR.
JOHN R. NEWMAN JR.
BY Whittemore,
Hulbert & Belknap
ATTORNEYS 3,006,060
GEAR FINISHING
John R. Newman, Jr., St. Clair Shores, Mich., assignor to National Broach & Machine Company, Detroit, Mich., a corporation of Michigan
Filed Dec. 9, 1957, Ser. No. 701,622
3 Claims. (Cl. 29—103)

The present invention relates to gear finishing.

It is an object of the present invention to provide a method for the production of double helical gears having axially separated tooth portions at least one of which has teeth which are longitudinally crowned.

It is a further object of the present invention to provide a gear finishing tool having teeth provided with independent axially extending concave modified portions.

Other objects and features of the invention will become apparent as the description proceeds, especially when taken in conjunction with the accompanying drawing, illustrating preferred embodiments of the invention, wherein:

FIGURE 1 is a fragmentary elevational view showing a double helical gear in mesh with a portion of a gear shaving cutter.

FIGURE 2 is an enlarged plan view of aligned teeth of an undesirable form eliminated by the present invention.

FIGURE 3 is a plan view of the gear in mesh at crossed axes with a cutter, illustrating the gear in a plurality of different positions.

FIGURE 4 is a fragmentary sectional view of a peripheral portion of a double helical work gear.

FIGURE 5 is a plan view of aligned teeth of the gear shown in FIGURE 4.

FIGURE 6 is a fragmentary sectional view of a gear shaving cutter for producing the modified tooth shown in FIGURES 4 and 5.

FIGURE 7 is a plan view of a tooth of the cutter shown in FIGURE 6.

FIGURE 8 is a view similar to FIGURE 7 showing a modified form of cutter.

The present invention relates to the finishing of a work gear such as illustrated at G in FIGURE 1. This gear is of the type referred to as double helical and includes axially separated portions 10 and 12 provided with helical involute teeth, the teeth of the portions 10 and 12 being in axial alignment and of identical form. The sections 10 and 12 of the gear are separated by a peripheral gap 14.

In order to improve operating characteristics of the gear it is desirable to shave the teeth thereof by an operation known as crossed axes gear shaving. This however, if carried out by the operation known as diagonal traverse, in which relative traverse between the gear and tool is in a direction occupying a plane parallel to the axes of the gear and tool and in a direction oblique to the axis of the gear, has been found to result in the teeth having an undesirable partial crown. This is illustrated in FIGURE 2 where a tooth 16 of the gear portion 10 is seen to be substantially wedge shaped and to be thicker at its inner end than at its outer end. Similarly, the aligned tooth 18 is found to be unsymmetrically crowned and to be wedge shaped, having its inner end substantially thicker than its outer end. It will be appreciated that the teeth 16 and 18 if connected by the dotted line indicated at 20, would take the form of a complete properly and symmetrically crowned gear tooth.

It may be mentioned at this time that where the teeth of the gear are referred to as double helical, it is intended to include any appropriate helix angle, in which the limiting case is a helix angle of zero degrees, or a spur gear. It will further be understood that the teeth of the cutter which will subsequently be described, are of the appropriate helix angle to mesh at crossed axes with the teeth of the gear.

Inasmuch as the teeth 16 and 18, as seen in FIGURE 2, are intended to run in mesh with separate gears, pinions or the like, it will be appreciated that the desirable form of these teeth should be separately crowned or at least not tapered.

In accordance with the present invention the teeth of the gear portions 10 and 12 are modified to the form illustrated at 22 and 24 in FIGURES 4 and 5. It will be seen that the teeth 22 separated by gap 14a are longitudinally convex or having a form which is referred to in the industry as "crowned." It will further be observed that this crowning is generally symmetrical about the centerline of the teeth and from end to end thereof. Similarly, the axially aligned teeth 24 are separately crowned and the crown is placed symmetrically thereon.

The desirable tooth form illustrated in FIGURES 4 and 5 is produced from a gear-like tool, preferably a shaving cutter Cb having teeth 30 the shape of which is best illustrated in FIGURES 6 and 7. In these figures it will be observed that the flanks of the teeth are serrated as indicated at 34, these serrations being in the form of shallow grooves extending up and down the flanks of the teeth and occupying a plane perpendicular to its axis. The serrations intersect the flanks of the teeth and provide sharp cutting edges thereat as is well understood in the art. In accordance with the present invention the teeth are divided into end portions at the plane indicated by the broken line 36, the end portion at the left being designated 38 and the end portion at the right being designated 40. The tooth portion 38 is provided with a longitudinally extending concave modification and the tooth portion 40 is provided with an independent longitudinally concave modification. The longitudinal concave modifications of the tooth portions 38 and 40 may be equal in amount or unequal and may be symmetrical or unsymmetrical with respect to the tooth portion. Preferably however, the longitudinal concave modifications have a line of juncture occupying the plane 36.

It will of course be appreciated that by the present arrangement only one of the tooth portions 38 and 40 may be longitudinally concave and the other may be unmodified to produce substantially unmodified teeth on the gear G.

In order to produce the results illustrated in FIGURE 5 the tool or cutter C is rotated in mesh with the gear G with the gear and cutter positioned with their axes crossing in space at a moderate angle as for example between three and thirty degrees. With the gear and cutter in pressure contact either the gear or cutter is driven in rotation at substantial speeds, the other of the members being driven solely by the meshed engagement therebetween.

In FIGURE 3 the relationship between the gear G and the cutter such as cutter C or Cb is illustrated with the parts in full lines, the axis of the cutter being illustrated at Ca and the axis of the gear in its intermediate position being illustrated at Ga. At this time it will be observed that the common perpendicular to the two axes appears in the figure as point XA or the point of crossed axes. This point determines the zone of maximum cutting between the gear and the cutter. It will further be observed that as relative traverse between the gear and cutter is provided to effect relative movement of the gear to the dot and dash line illustrated at G2, the center of crossed axes shifts to the position XA2 and that at this time the center of crossed axes is located at the left hand side of the gear. Similarly, when relative traverse in the opposite direction is carried out to position the gear relative to the tool in the position indicated by dotted lines at G3, the center of crossed axes will have shifted to the opposite side of the gear and to the opposite side of the cutter to the position designated XA3.

It will thus be seen that as the relative traverse takes place in the direction of the arrow T each portion of the aligned teeth of the portions 10 and 12 of the gear are finished by different axially spaced portions of the tooth of the cutter. Accordingly, if the cutter Cb is used, the tooth portion 22 of the gear is finished by the tooth portion 38 of the cutter and will have a crown imparted thereto dependent upon the amount of concavity of the tooth portion 38 of the cutter. In like manner, the tooth 24 of the gear is separately crowned by the tooth portion 40 of the cutter and the amount of crowning imparted to the tooth 24 is of course dependent upon the amount of concavity provided in the cutter tooth portion 40.

It will of course be apparent that if desired only one portion of the cutter tooth need be made concave and thus, different amounts of crown may be imparted to the teeth of the gear varying from zero crown to the maximum desired crown.

As best illustrated in FIGURE 7, the tooth portions 38 and 40 of the cutter have a juncture indicated at 42 and the direction of traverse as indicated by the arrow T is selected such as to cause the juncture to remain within the gap 14 between axially aligned teeth on the gear.

In FIGURE 8 a fragment of a modified cutter 50 is illustrated having helically aligned teeth each composed of separated portions 52 and 54 provided with a gap 56 therebetween. It will be appreciated that the cutter illustrated in FIGURE 8 is equivalent to that illustrated in FIGURES 6 and 7 except for the provision of the gap between the independently longitudinally concavely modified tooth portions. With this arrangement each of the tooth portions 52 and 54 will carry out a gear shaving operation with respect to the corresponding tooth portion of the gear such for example as the tooth portions 22 and 24 thereof shown in FIGURE 5.

It may be mentioned that the present invention is relatively simple in commercial production since the cutter teeth may initially be formed to the required shape without modification and the grinding operation performed as a final operation to produce the axially separate zones of concave modification.

The drawing and the foregoing specification constitute a description of the improved gear finishing in such full, clear, concise and exact terms as to enable any person skilled in the art to practice the invention, the scope of which is indicated by the appended claims.

What I claim as my invention is:

1. A gear finishing tool for crown shaving double helical gears, said tool being in the form of a cylindrical gear having teeth, each of said teeth comprising two portions disposed in endwise alignment, each of said portions being provided with grooves extending generally up and down the flanks thereof and forming cutting edges at the intersections between the sides of said grooves and the flanks of said tooth portions, each of said tooth portions having flanks which are longitudinally concave and which are symmetrical about a plane of symmetry perpendicular to the axis of the tool and located substantially midway between the ends of each of said tooth portions.

2. A cutter as defined in claim 1 in which the said two portions of each tooth are spaced apart.

3. A cutter as defined in claim 1 in which the said two portions of each tooth are continuous.

References Cited in the file of this patent

UNITED STATES PATENTS

| | | |
|---|---|---|
| 2,165,386 | Klomp | July 11, 1939 |
| 2,200,584 | Simmons | May 14, 1940 |
| 2,214,225 | Drummond | Sept. 10, 1940 |
| 2,228,965 | Miller | Jan. 14, 1941 |
| 2,298,471 | Drummond | Oct. 13, 1942 |
| 2,311,037 | Drummond | Feb. 16, 1943 |
| 2,380,224 | Drummond | July 10, 1945 |
| 2,557,462 | Praeg | June 19, 1951 |
| 2,682,100 | Pelphrey | June 29, 1954 |
| 2,738,569 | Praeg | Mar. 20, 1956 |
| 2,873,652 | Gates | Feb. 17, 1959 |

FOREIGN PATENTS

| | | |
|---|---|---|
| 392,385 | Great Britain | Apr. 18, 1933 |